June 8, 1926.
A. F. BANDUR
1,587,744
LOADING COIL CASE
Filed Feb. 5, 1924
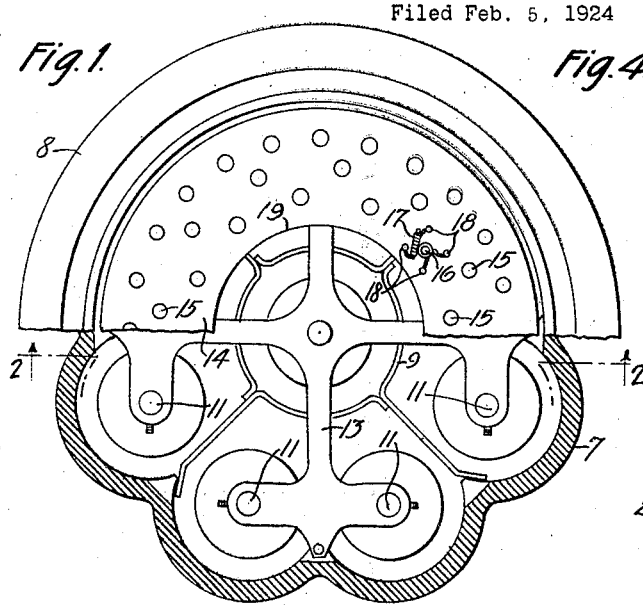
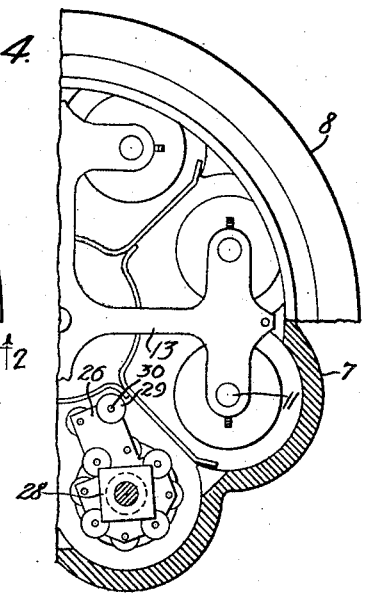
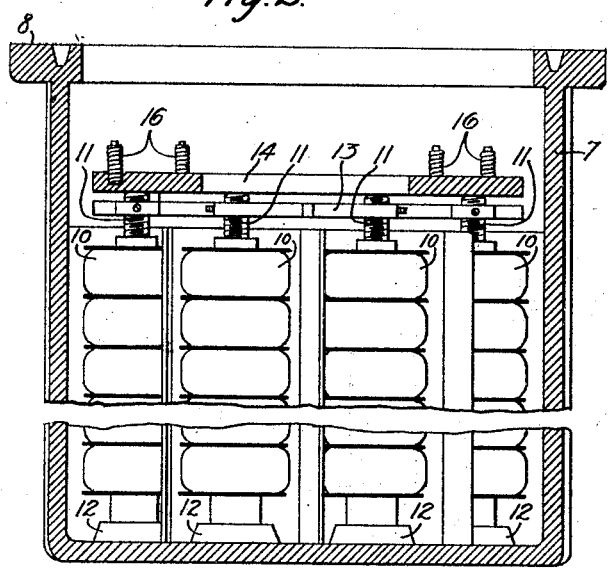
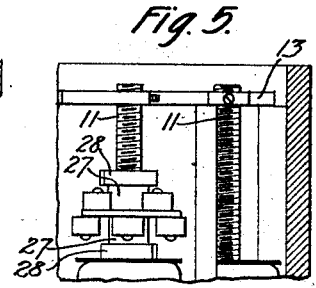
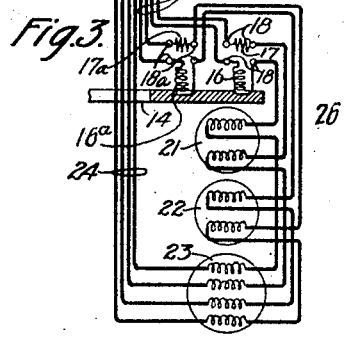
Inventor:
Adolph F. Bandur
by Patented June 8, 1926.

1,587,744

UNITED STATES PATENT OFFICE.

ADOLPH F. BANDUR, OF BERWYN, ILLINOIS, ASSIGNOR TO WESTERN ELECTRIC COMPANY, INCORPORATED, OF NEW YORK, N. Y., A CORPORATION OF NEW YORK.

LOADING-COIL CASE.

Application filed February 5, 1924. Serial No. 690,796.

This invention relates to loading coil cases and particularly to means for mounting auxiliary apparatus therein.

It is an object of this invention to reduce the phantom circuit to side circuit cross talk in transmission circuits.

It is a further object of this invention to provide a simple and inexpensive means for mounting auxiliary apparatus in loading coil cases.

In transmission circuits in which four line conductors are combined to form two physical circuits and one phantom circuit, cross talk between the phantom circuit and one of the side circuits is very likely to be produced by impedance unbalance between the two conductors forming the side circuit. Unbalance in the windings of the loading coils may be one of the chief causes of this impedance unbalance.

In accordance with this invention, means are provided for adjusting the inductance balance of the loading unit as a whole. This is done by connecting together in the usual manner the two side circuit and the phantom circuit loading coils whose individual inductances have been balanced to the nearest turn and then balancing the inductance of the entire unit by connecting inductance balancing coils in the line windings of the unit. The inductance balancing coils are mounted in the top compartment of the loading coil case, thus not only providing a simple and inexpensive way of mounting, but also making it possible to adjust the cross talk of the loading units after they are mounted in the case.

This invention can be clearly understood by reference to the following description in connection with the drawing in which: Fig. 1 is a plan view, in partial section, of a loading coil case embodying one form of the invention; Fig. 2 is a vertical section taken on the broken line 2—2 of Fig. 1; Fig. 3 is a diagrammatic view showing the manner of making the connections; Fig. 4 is a plan view in partial section showing a loading coil case illustrating a second method of mounting the balancing coils; and Fig. 5 is a partial vertical section of the loading coil case shown in Fig 4.

Referring to Figs. 1 and 2, there is shown a loading coil case comprising an outer housing 7 having a flange 8 upon which a cover fits, the housing being made of magnetic material, preferably cast iron. The space within the housing is divided into shielded compartments by means of partitions 9 made of magnetic material. The loading coils 10 are mounted in these compartments on spindles 11 made of non-magnetic material, such as hard wood. The spindles are supported at one end in bosses 12 in the bottom of the casing, while at the other end, they are clamped in a spider 13 which is fastened to the wall of the casing.

After the loading coils 10 are mounted in the case, a terminal board 14 is placed above them. This board is provided with a central opening 19 through which the spindle cables can be carried down to the loading coils. The opening 19 is of such a diameter that the leads from the inductance balancing coils can be carried down between its outer edge and the wall of the casing. The terminal board is made of non-magnetic material, preferably hard wood, and is provided with a number of sockets 15 in which the inductance units 16 can be mounted. The sockets are so arranged that when the inductance coils are mounted therein there is substantially no interlinkage of magnetic flux between them. In order to avoid confusion only one coil is shown. Four terminals 18 are provided around each socket. The crosstalk from the phantom circuit to each physical circuit is measured and a balancing coil 16 of proper inductance for reducing this crosstalk is connected into the proper line winding. These inductance units 16 are made by winding a coil around a core composed of silicon steel or of iron dust core material, such as that described in U. S. Patent No. 1,274,952 to J. B. Speed, issued August 6, 1918.

It has been found that unbalance in the direct current resistance may produce some phantom circuit to side circuit crosstalk and consequently it may sometimes be desirable to employ noninductive resistance units to bring about a resistance balance. Straight core inductance balancing coils may have resistances of such a magnitude that it is desirable to counterbalance them. Small resistance units 17 for this purpose may be connected in the opposite side of the physical circuits.

Fig. 3 shows diagrammatically how the connections in the circuit described above are made. Cable stub 20 enters the case through an opening in the center of the cover. Quad 24 is run down through the opening in the center of the terminal board 14 and connected to one side of the phantom circuit coil 23. The quads going to units on the same spindle are usually grouped together to form a spindle cable. The phantom circuit coil is connected to the two side circuit coils 21 and 22 in the usual manner. Leads from the two side circuit coils are brought up between the mounting board and the wall of the casing and connected to binding posts 18 and 18ª respectively. The crosstalk from the phantom to each side circuit can then be measured and inductance balancing coils 16 and 16ª inserted in the side having the lower inductance, while the resistance units 17 and 17ª are inserted in the opposite wires, as explained above. The quad 25 can then be connected to the other binding posts which are connected to the opposite sides of the balancing coils.

It is often desirable to make each spindle unit complete so that one spindle with its loading and balancing coils can be removed without disturbing the other units. This is done by providing each spindle with a separate plate on which the inductance balancing coils are mounted. It is somewhat difficult to mount coils of the straight core type as compactly as this requires without some interlinkage of magnetic flux which gives rise to other kinds of crosstalk, such as side circuit to side circuit. However, inductance coils of the type described in the copending application of S. Z. Chylinski, Serial No. 681,358, filed Dec. 18, 1923, are particularly desirable for this use since by staggering them in the manner described by Chylinski they can be mounted in a small space with practically no mutual inductance.

This staggered method of mounting is shown in Figs. 4 and 5. These figures show a loading coil case of the same general type as that shown in Figs. 1 and 2 except that the spider 13 is mounted nearer the top. A mounting board 26 is then placed on the spindle between the loading coils and the spider. This mounting board is supported by washers 27 and nuts 28. The inductance coils 29 are mounted on the board 26 by means of bolts 30, the coils being staggered in mounting to reduce the mutual inductance. These inductance coils are connected in the same way as the straight core coils but, since their resistances are relatively low, balancing resistance units are usually not necessary.

What is claimed is:

1. In combination, a transmission system comprising four line conductors arranged to form two side circuits and one phantom circuit, a loading unit for said system comprising a side circuit loading coil connected in one of said side circuits, a second side circuit loading coil connected in the other of said side circuits and a phantom circuit loading coil connected in both of said side circuits, and means for adjusting the phantom circuit to side circuit cross talk comprising an inductance coil having a separate magnetic core and connected in each of said side circuits for simultaneously balancing the impedance of both the phantom circuit loading coil and the side circuit loading coil.

2. In combination, a loading coil case, a plurality of loading units mounted therein, each of said units comprising a phantom circuit loading coil and a plurality of side circuit loading coils, means for reducing the phantom circuit to side circuit cross talk comprising a plurality of inductance coils connected to said loading units, and means for mounting said inductance coils above said loading units.

3. In combination, a loading coil case having a space for mounting loading coils and an opening for introducing loading coils into said space, a plurality of loading coils mounted in said space, means between said coils and said opening for mounting auxiliary apparatus, a plurality of inductance balancing coils mounted on said means, and connections from said loading coils to said inductance coils.

4. In combination, a loading coil case having a space for mounting loading coils and an opening for introducing loading coils into said space, a plurality of loading coils mounted in said space, a mounting plate located between said loading coils and said opening, a plurality of impedance balancing coils mounted on said plate, and connections between said loading coils and said impedance balancing coils.

5. In combination a loading coil case having a space for mounting loading coils and a space for distributing leads to said coils, loading coils mounted in said first mentioned space, mounting means located in said last mentioned space, a plurality of impedance balancing coils on said means and connections between said loading coils and said impedance balancing coils.

In witness whereof, I hereunto subscribe my name this 31st day of January, A. D. 1924.

ADOLPH F. BANDUR.